Figure 1:
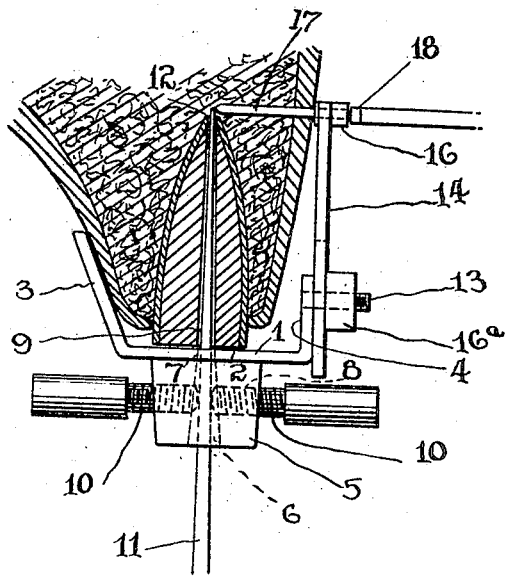

G. EVANS.
DENTAL INSTRUMENT.
APPLICATION FILED MAY 17, 1921.

1,417,236.

Patented May 23, 1922.

Inventor
George Evans
By his Attorney F. W. Barker

UNITED STATES PATENT OFFICE.

GEORGE EVANS, OF NEW YORK, N. Y.

DENTAL INSTRUMENT.

1,417,236. Specification of Letters Patent. Patented May 23, 1922.

Application filed May 17, 1921. Serial No. 470,243.

*To all whom it may concern:*

Be it known that I, GEORGE EVANS, a citizen of the United States, and resident of the borough of Manhattan, in the city, county, and State of New York, have invented certain new and useful Improvements in Dental Instruments, of which the following is a specification.

This invention relates to dental surgery, and my improvement is directed to means for determining the exact location of the root-apex of a tooth to permit the application of treatment at that point, as in the case of an abscess.

The apices of roots of the human teeth are imbedded in solid bone of the jaw, and when an abscess forms on the apex of one of these roots a small hole made through the bone to the apex of the root, and the abscess, will serve as a drainage vent and permit treatment of the lesion.

Under present practice considerable difficulty is experienced in ascertaining the exact location of the root-apex, because no definite means are available to guide the operator, and often considerable destruction of bone occurs in the more or less haphazard efforts that are made for this purpose.

Therefore my invention consists of a measuring instrument, which I term an "apicometer," and which comprises a frame adapted to seat over the tooth or outer portion of the root whose apex is to be treated, said frame carrying length adjusting, and securing means for a probe that is to be entered through the root canal to the point of emergence just beyond the root-apex. Said frame also has means whereby a guide member may be adjusted thereon to have coincident length with the set length of the probe, in the same vertical plane, so that a drill, directed by said guide from the exterior of the jaw, may be caused to penetrate the bone exactly at right angles to the probe end when the latter has located the root-apex, thereby enabling the production of a drainage vent with mathematical precision.

Other features of my invention will hereinafter appear.

In the drawing:—

Figure 2:
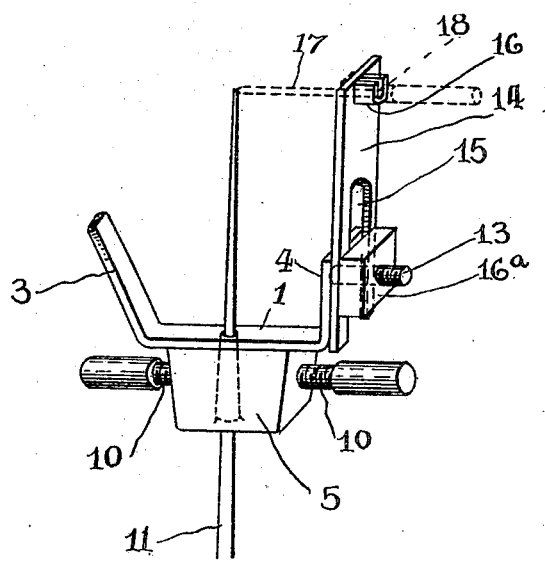

Figure 1 is a vertical sectional view of a root as seated in the jaw, and with my improved measuring device adjusted in service, and Fig. 2 is a perspective elevation of the device.

In carrying out my invention I provide a saddle-like member having the flat, bar-like portion 1 to lie over the tooth or root end 2; the angular extension 3, to bear against the inner gum surface, to localize said member, and the opposite, right angular extension 4, whose function will be referred to hereinafter.

The portion 1 carries at its outer surface a block 5, which is provided with a central aperture 6, conoidal in form, and narrowing toward the portion 1, where said aperture axially aligns with an orifice 7 in the portion 1, and with the root canal 9. Also said block 5 is provided with a transverse, threaded aperture 8, that intersects aperture 6, and is fitted with the opposite set screws 10, 10, whose respective ends are intended to clamp between them a probe 11 that has been introduced in the aperture 6, through orifice 7 and into canal 9.

In practice, the probe 11 is passed through the full extent of a canal 9 and its end caused to emerge just beyond the root apex 12, and then said probe 11 is clamped between the screws 10, to set it, thereby determining the exact axial measurement of the canal. The conoidal form of aperture 6 permits some lateral play to the probe in the block 5 while following through the canal, and allowance for this play is compensated by individual adjustment of the screws 10, thereby indicating the angle of the canal axis relatively to the portion 1 of the saddle-like member.

With the extent and angle of the canal thus determined the device, having the set probe, is removed from the mouth of the patient, and then a drill guide is fitted to said device as follows:

The right angular extension 4 of the saddle-like member is provided with a threaded post 13, and a plate or bar 14, having a slot 15, engages said post 13 by said slot, so that said plate or bar may be adjustable as to the extent of its length beyond portion 1. A nut 16, engaging post 13, secures the plate or bar 14 in its adjusted position.

The plate or bar 14 is provided, at or near its outer end, with a seat formation 16, whose base line is at a right angle with the longitudinal axis of said plate or bar, thus constituting a guide for a drill.

The guide member, thus described, is to be adjusted, in approximate parallelism with the set probe 11, so that an imaginary line drawn along the seat formation 16 will intersect the end of probe 11 that had emerged beyond the root-apex on the probe setting operation already described.

This adjustment can readily be effected by the means referred to.

The next step in preparing the instrument for service consists in fitting a drill 17 to the seat 16, with its point directed toward the probe end. Upon said drill I place a ferrule 18, that is capable of axial adjustment relatively to the drill, so that, with said ferrule bearing against the outer end of seat 16, which serves as a stop, the extended length of drill 17 will be such that its point intersects the probe end. Thus gauged, the measurements will have been accurately defined—the drill can be withdrawn, the instrument again inserted in the mouth, with the saddle-like member upon the tooth or root end, and the probe extended through the root canal. Then the drill can be operated in the usual manner and a hole bored thereby through the bone for the full extent of the measured portion of the drill, limited by the engagement of the ferrule with the seat end, as a stop.

By these means a vent hole is provided that unerringly connects with the root apex. To assure the operator that the vent hole drilled through the bone has reached the end of the probe or broach as the latter extends out of the apex of the root, I introduce an exploring instrument, with a barbed or hooked point, to the location of the apex of the root through the hole in the bone, and engage the end of the broach or probe with the barbed or hooked end of the instrument. The handle of the instrument is flattened or otherwise shaped on the side at right angles to the line of the projecting barb or hook, to indicate by the sense of the touch the direction of the barb or hook.

With the establishment of such proof, the instrument may be removed from the mouth, and suitable treatment then applied through the hole direct to the root apex.

The means of axial adjustment for the ferrule 18 may be of any suitable character, but a means found desirable by me is by binding the ferrule on the drill shank with a resinous or cementitious substance, that softens under the application of heat, and which, when so softened, permits the convenient adjustment of said ferrule.

Variations within the spirit and scope of my invention are equally comprehended herein.

I claim:—

1. A dental instrument comprising means for determining the extent of a root canal, a holder therefor, and guide means carried by said holder to co-operate therewith and permit the drilling of a hole through the root embedding bone to intersect the root apex.

2. A dental instrument comprising a member to fit over a root end, a probe to gauge the extent of the root canal, and laterally adjustable means upon said member to secure said probe in a set position relatively to said member.

3. A dental instrument comprising a member to fit over a root end, a probe to gauge the extent of the root canal, and drill guide means settable upon said member with relation to said probe to direct the drilling of a hole at right angles to said canal to intersect the root apex.

4. An apicometer comprising a saddle-like member to seat upon a tooth or root end, said member having an orifice to align with the root canal, a block carried by said member, said block having an aperture aligned with the orifice in said member, a probe entered through said aperture and orifice to gauge the extent of the root canal, for emergence of the probe end just beyond the root apex, and means carried by said member to direct the drilling of a hole in intersecting relation with the emerging probe end.

5. An apicometer comprising a saddle-like member to seat upon a tooth or root end, said member having an orifice to align with the root canal, a block carried by said member, said block having a conoidal aperture aligned with the orifice in said member, and a transverse aperture intersecting said conoidal aperture, a probe entered through said conoidal aperture and orifice to gauge the extent of the root canal, for emergence of the probe end just beyond the root apex, opposed screws engaged in said transverse aperture to clamp said probe in its adjusted position, and means carried by said member to guide a drill into intersecting relation with the emerged probe end.

6. An apicometer comprising a saddle-like member to seat upon a tooth or root end, a probe adapted to enter the root canal for emergence just beyond the root apex, means carried by said member to secure said probe thereto, a drill guide carried by said member, a drill entered in said guide; and means of adjustment for said drill guide relatively to said member, whereby said drill is operable right angularly to the axis of said probe for intersection with the emerged end thereof, beyond the root apex.

7. An apicometer comprising a saddle-like member to seat upon a tooth or root end, a probe adapted to enter the root canal for emergence just beyond the root apex, means carried by said member to secure said probe thereto, a drill guide carried by said member, a drill entered in said guide; means of adjustment for said drill guide relatively to said member, whereby said drill is operable right angularly to the axis of said probe for intersection with the emerged end thereof, beyond the root apex, and axially settable means for said drill to limit the extent of its movement relatively to said guide.

Signed at the borough of Manhattan, in the city, county and State of New York, this 16th day of May, A. D. 1921.

GEORGE EVANS.